United States Patent [19]

Miner et al.

[11] 4,305,548
[45] Dec. 15, 1981

[54] ENERGY LOSS DETECTION SYSTEM

[75] Inventors: David W. Miner; Mark D. Driscoll; John E. Sorenson; Robert T. Kirchner; David A. Keech, all of Three Rivers, Mich.

[73] Assignee: Armstrong Machine Works, Three Rivers, Mich.

[21] Appl. No.: 113,835

[22] Filed: Jan. 21, 1980

[51] Int. Cl.³ .............................................. F24D 1/02
[52] U.S. Cl. ....................................... 237/67; 55/319; 55/355; 55/465
[58] Field of Search ................... 236/52, 94; 237/9 R, 237/67; 55/319, 355, 462, 465

[56] References Cited

U.S. PATENT DOCUMENTS

| | | | |
|---|---|---|---|
| 236,247 | 1/1881 | Osborne | 237/12.1 |
| 265,698 | 10/1882 | Osborne . | |
| 1,622,715 | 3/1927 | Hawxhurst . | |
| 2,936,622 | 5/1960 | Glasgow . | |
| 2,938,380 | 5/1960 | Smith . | |
| 3,048,035 | 8/1962 | Richards et al. . | |
| 3,064,474 | 11/1962 | Parks . | |
| 3,597,676 | 8/1971 | Moore . | |
| 3,926,368 | 12/1975 | Geen | 236/94 |
| 4,178,801 | 12/1979 | Cassell . | |
| 4,249,697 | 2/1981 | Savage, Jr. | 236/94 |

Primary Examiner—Herbert Goldstein
Attorney, Agent, or Firm—Blanchard, Flynn, Thiel, Boutell & Tanis

[57] ABSTRACT

An energy loss detection system includes an apparatus for measuring loss of the vapor phase of a bi-phase fluid. Such apparatus is interposable in an energy transfer circuit downstream of an energy consumer device, intended to take energy from the bi-phase fluid by converting the vapor phase to liquid, and upstream of a potential energy loss device. The apparatus includes a separator for separating the vapor and liquid phases of the bi-phase fluid into separate flow paths. A probe senses the flow rate of the vapor phase through the separator and produces a signal related thereto. An output apparatus includes a read-out device responsive to the probe signal for producing a display indicative of vapor flow rate and hence of energy loss downstream of the separator.

9 Claims, 6 Drawing Figures

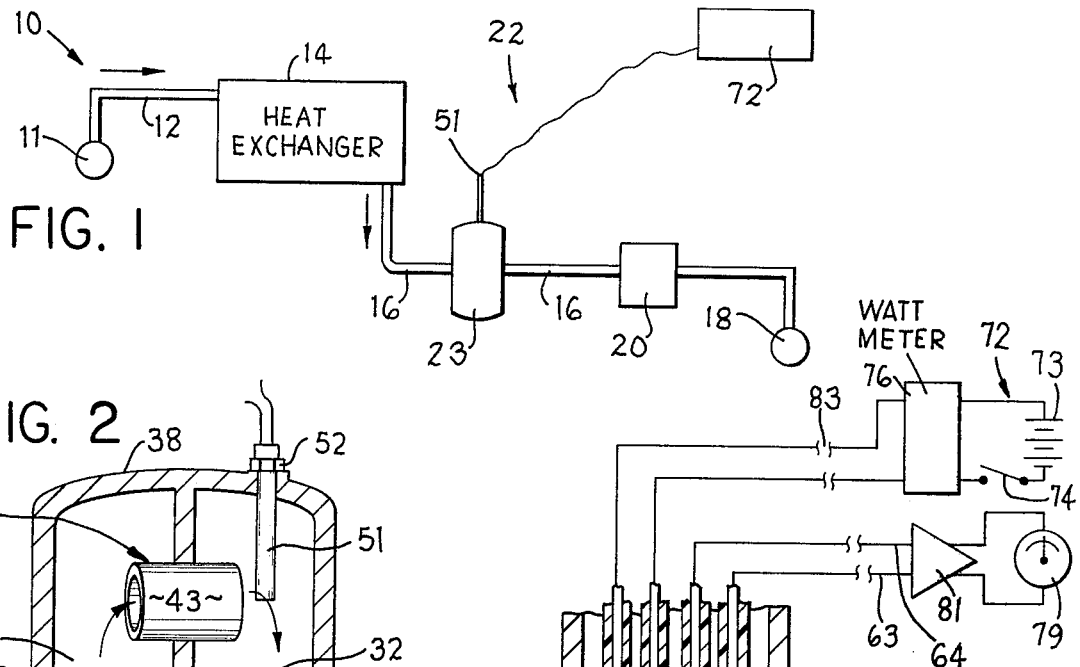
FIG. 1
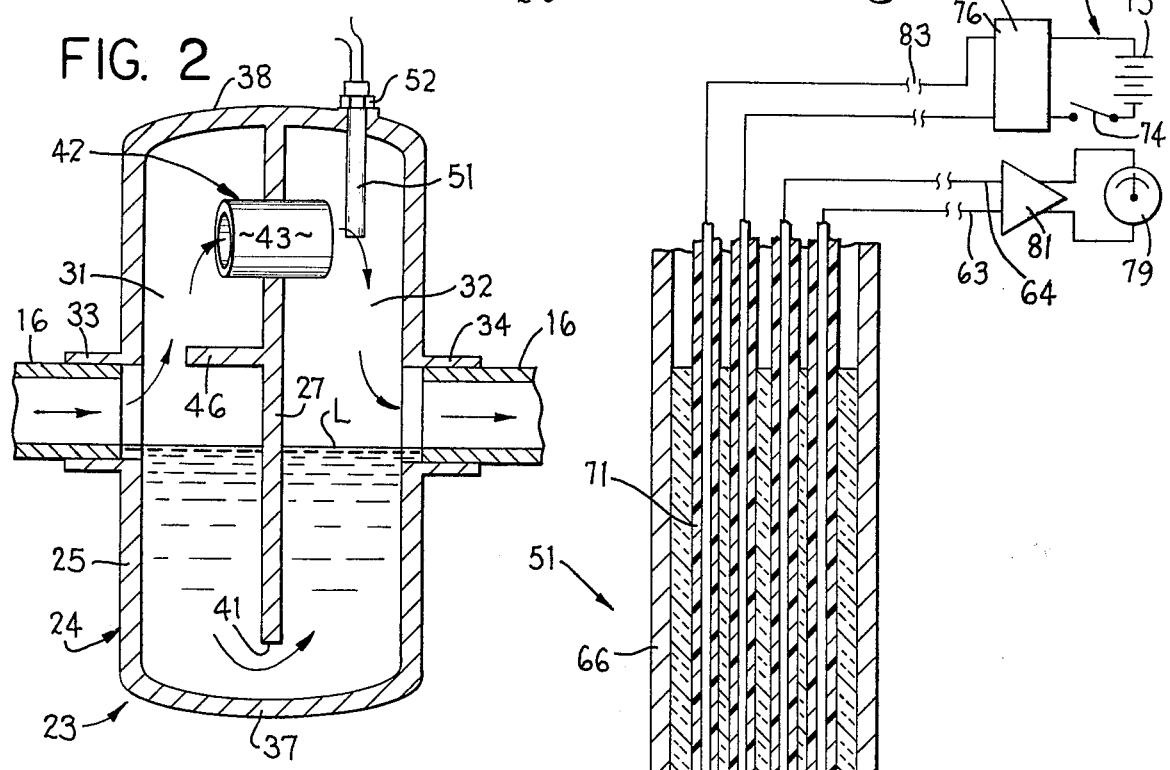
FIG. 2
FIG. 3
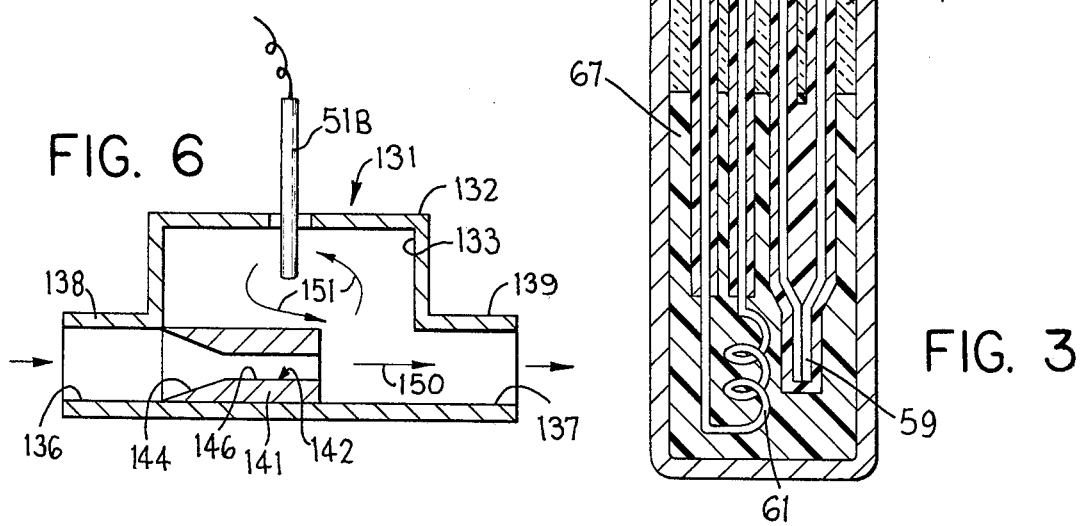
FIG. 6

4,305,548

ENERGY LOSS DETECTION SYSTEM

FIELD OF THE INVENTION

This invention relates to an energy loss detection system, and more particularly to a system for detecting energy loss, in terms of vapor phase loss, in a bi-phase fluid circuit, such as in a steam circuit.

BACKGROUND OF THE INVENTION

While useful for other purposes, the present invention was developed in view of a vexing energy loss problem in steam systems. Thus, while disclosed below, for convenience, in terms of energy loss detection in steam systems, it is not intended to limit the invention to that environment.

In conventional steam systems, steam is transferred as a source of heat energy to a load. As heat energy is transferred to the load, the steam condenses. A steam trap then discharges this condensate, while retaining the steam within the system. However, as the steam trap wears out, steam is increasingly lost from the trap and such losses can develop into a significant energy waste.

Three methods have commonly been used in an attempt to determine the steam loss of a steam trap and such known methods are listed below, along with disadvantages thereof.

1. The first prior known method is based on visual observation. This method requires the output, or discharge, of the trap to the atmosphere for observation. However, atmospheric discharge is not always possible, due to the way that the trap has been piped, or installed, into a condensate return system.

Moreover, with several different types of steam traps available on the market, visual observation requires considerable training and skill to determine steam losses. While it may be possible to determine with some reliability that a gross trap failure has occurred, estimating the magnitude of any steam losses cannot be done accurately as the following table illustrates

| Trap at 150 psig Discharges | At Atmospheric Pressure Mass Flow | Discharge Changes to Volume Flow |
| --- | --- | --- |
| 1. 82 #/hr. Cond. | 68.6 #/hr. Cond. | 1.15 cu.ft./hr. Cond. |
| 0 #/hr. Steam | 13.4 #/hr. Steam | 360 cu.ft./hr. Steam |
| 2. 50 #/hr. Cond. | 41.6 #/hr. Cond. | .695 cu.ft./hr. Cond. |
| 5 #/hr. Steam | 13.4 #/hr. Steam | 360 cu.ft./hr. Steam |

In the table above, Trap 1 has no steam loss, but actually discharges a considerable amount of steam at atmospheric pressure due to flashing of the condensate as the pressure is reduced. As the human eye actually sees a volume flow, in the above examples a large cloud of steam and a few drops of water would be seen.

On the other hand, Trap 2, which is defective and has a steam loss, discharges the same volume of steam as trap 1 but a somewhat smaller volume of condensate. However, the human eye would be very hard pressed to determine which of these two traps actually had a steam loss.

2. The second prior known method is based on a pyrometer. In some areas it has been common practice to test traps by reading upstream and downstream trap temperatures with a pyrometer. If the temperature difference is very high, the trap has been considered to be in satisfactory condition, while if the temperature difference is very low, the trap has been considered to be defective.

This tends to be a very dubious method as the outlet temperature follows the saturation temperature/pressure relation for steam. A trap with a high rate of steam loss, discharging to a much lower pressure, will display a very high temperature difference. On the other hand, a good trap, discharging through a very low pressure difference, will display very low temperature difference. In actual field service with a condensate return system, the trap outlet pressure is seldom, if ever, known. Accordingly, such temperature difference readings can be highly misleading as to the condition of the trap.

3. The third prior known method is based on sonic or ultrasonic monitoring. A highly trained person using a stethoscope or an ultrasonic device can inspect a trap for steam loss. However, considerable skill and training is required to understand the normal mode of operation of all the various available traps and to be able to distinguish abnormal operation. Sound devices generally can only be used to make a good/bad judgment of trap operation, and cannot accurately quantify the magnitude of a steam loss.

Accordingly, such known prior methods have not been entirely satisfactory for monitoring energy losses in a bi-phase fluid system, particularly for monitoring steam losses in a steam trap.

Accordingly, the objects of this invention include provision of:

An energy loss detecting apparatus which is free of the foregoing limitations of the above-discussed known prior methods.

A system, as aforesaid, which, for measuring a steam loss in a steam trap, remains at supply steam pressure and avoids pressure drops as may cause flashing of condensate to steam, and which is capable of high accuracy by measuring directly the steam loss to the steam trap.

A system, as aforesaid, capable of monitoring steam trap condition regardless of the type of steam trap operating in the steam circuit.

A system, as aforesaid, capable of displaying steam flow (or loss) in any desired units, and capable of reducing the skill level required of the operator in determining steam loss, as compared with steam loss detection methods above discussed.

A system, as aforesaid, capable of separating a mixture of vapor and liquid into separate streams and measuring the velocity of the vapor phase independent of the condition of the liquid phase.

A system, as aforesaid, capable of measuring energy loss in terms of the flow rate of the vapor phase of a bi-phase fluid, and wherein the flow rate measurement can readily be implemented, for example by a temperature responsive probe.

Other objects and purposes of this invention will be apparent to persons acquainted with apparatus of this general type upon reading the following specification and inspection of the accompanying drawings.

SUMMARY OF THE INVENTION

The objects and purposes of the invention are met by providing an energy loss detecting system including an apparatus for measuring the rate of flow of the vapor phase of a bi-phase fluid flow, in the presence of an unknown quantity of the liquid phase. Means interposed in the fluid flow separate the vapor phase from the liquid phase and direct the vapor phase along a vapor flow path free of the liquid phase. Means responsive to flow of the vapor phase through the vapor flow path produce a signal related to the vapor phase flow rate. Energy loss in a steam circuit, due for example to a faulty steam trap, is measurable by interposing the vapor flow rate measuring apparatus in a steam line between a steam consuming device and the steam trap.

BRIEF DESCRIPTION OF THE DRAWINGS

FIG. 1 is a schematic diagram of a steam circuit incorporating an energy loss detection system embodying the invention.

FIG. 2 is an enlarged, fragmentary, central cross-sectional view of a portion of the energy loss detection system of FIG. 1.

FIG. 3 is a schematic diagram showing a probe and readout circuit usable in the vapor flow rate measuring appartus of FIG. 2.

FIG. 6 is a central cross-sectional view of a further modified energy loss detection system.

DETAILED DESCRIPTION

Figure 5:
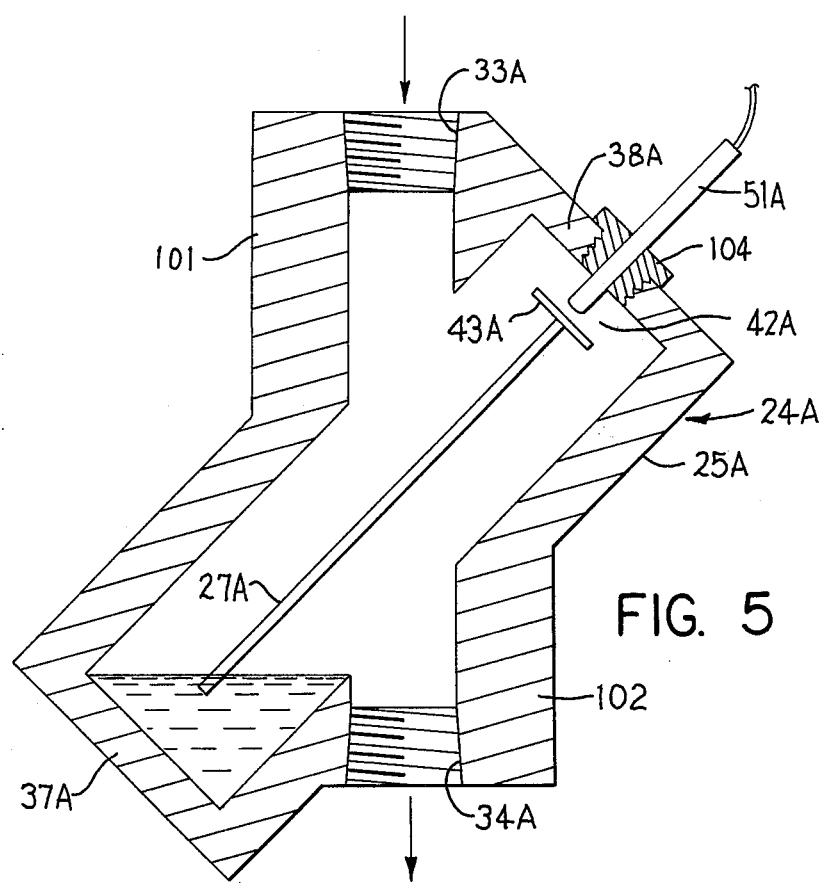
FIGS. 4 and 5 are central cross-sectional views of a modified energy loss detection system oriented for installation in vertical and horizontal conduit lines, respectively.

FIG. 1 discloses a bi-phase fluid circuit, in particular a steam circuit 10 comprising a steam source 11 of any conventional type. The steam source 11 applies steam through a conduit 12 to a steam consumer device, or load, 14. In normal operation, the heat energy in the steam is transferred to the consumer device 14. In the embodiment shown, the consumer device 14 is a heat exchanger, but other types of consumer devices may be employed in which heat is for example converted to mechanical motion, electrical energy or other energy forms.

A further conduit 16 connects the return side of the heat exchanger to a return main 18 leading back to the steam source 11, to enable steam source 11 to add more heat energy to the returning condensate, return same to its vapor phase and once again route same through the heat exchanger 14. The schematically indicated steam source 11 may include, for example a conventional boiler and fluid circulating pump.

It is conventional in such steam systems to provide a steam trap 20 in the return conduit 16 from the steam consumer device 14. The steam trap 20 may be of any conventional type, for example as disclosed in U.S. Pat. No. 4,149,557, issued Apr. 17, 1979, and assigned to the assignee of the present invention and the disclosure of which is incorporated herein by reference.

As heat in the steam is transferred to the consumer device 14, the steam fed thereto condenses to its liquid phase and is released by the return side of the consumer device 14 to the conduit 16 as condensate. The steam trap 20 is intended to discharge this condensate to the return main 18, but prevent escape of steam therepast, so as to maximize the transfer of heat energy to the consumer device 14 by maximizing conversion of steam to condensate in the consumer device.

To the extent above described, the steam circuit 10 is conventional and operates in a conventional manner.

A difficulty arises in such a steam circuit 10 in that the steam trap may become damaged or may eventually begin to wear out, permitting steam to be lost from the consumer device through the trap. This represents an energy loss from the steam circuit and can develop into a very significant energy waste.

Applicants have recognized that measurement of the vapor phase (steam) flow to the steam trap is thus a measure of the energy loss, or waste, of the trap.

The present invention provides for measuring the energy (steam) loss upon occurrence of a defect in the steam trap 20, by providing an energy loss measuring apparatus generally indicated at 22. The apparatus 22 includes a sensing unit 23 interposed in the conduit 16 between the outlet of the steam consumer device 14 and the inlet of the steam trap 20. In the preferred embodiment shown, the sensing unit 23 includes a separator 24 having a hollow, generally upstanding casing 25. An upstanding baffle 27 is fixed within the casing 25 and divides its interior into side-by-side inlet and outlet chambers 31 and 32. The casing 25 has inlet and outlet openings, here defined by conventional pipe fittings 33 and 34, respectively, fixed to the peripheral wall of casing 25. Inlet and outlet openings 33 and 34 open respectively into the inlet and outlet chambers 31 and 32. The inlet and outlet openings 33 and 34 are both spaced above the bottom 37 of casing 25 and spaced below the top 38 of casing 25.

Thus, the bottom portion of the casing 25, below the inlet and outlet openings 33 and 34, forms an upward opening basin which is normally filled with liquid, here condensate flowing through line 16 from the steam consumer device 14 to the steam trap 20. The baffle 27 extends downward into such basin below the inlet and outlet openings 33 and 34 and hence below the normal working condensate level L therein, to block vapor flow through the bottom portion of casing 25 between the casing inlet and outlet openings 33 and 34. However, an opening 41 is provided between the baffle 27 and the bottom 37 of casing 25, below L, to permit flow of condensate past the baffle 27, from the casing inlet 33 to the casing outlet 34.

In the upper end of the casing, above the inlet and outlet openings 33 and 34, a vapor port 42 provides gas flow communication between the inlet and outlet chambers 31 and 32 through the upper portion of the baffle 27. In the preferred embodiment shown, the vapor port 42 is an elongate transverse duct, here shown in an open-ended tube 43, penetrating the baffle 27 and providing a suitable cross section, longitudinally extending flow path for the gaseous phase of the fluid flow through the casing 25. Passage of liquid through port 42 is avoided by spacing the vapor port well above the residual liquid level L and inlet and outlet openings 33 and 34, and by a splash-prevention ledge 46 extending transversely part-way across the inlet chamber, vertically between the inlet opening 33 and vapor port 43, and here shown as fixedly cantilevered from the inlet side of baffle 27.

A vapor flow sensing probe 51 is fixedly mounted at 52 on the top portion 38 of casing 25 and extends through the casing wall into the vapor flow through tube 43. The probe is thus placed in the separator in the area of the vapor phase flow to sense the velocity of the vapor and hence provide an output signal which is a function of vapor phase flow rate. Various types of probes may be employed for this purpose, examples including hot wire anemometer, thermister, heater-thermocouple and Pitot tube probes.

By way of example, FIG. 3 schematically discloses a suitable probe 52 of the heater-thermocouple type.

Basically, such probe includes a sensing thermocouple 59 heated above ambient temperature by an electric resistance heating element 61. As vapor velocity past the probe increases, the vapor flow carries away an increasing amount of the heat generated by heater 61 and thereby reduces the temperature at sensing thermocouple 59. Accordingly, the output signal of the thermocouple 59, appearing across the output conductors 63 and 64, varies as a function of changes in cooling of the heated sensing thermocouple 59, hence with changes in vapor velocity through port 42. The probe 52, as here shown, conventionally includes a thermally conductive outer skin (e.g., of metal), a thermally conductive but electrically insulative filling 67 surrounding heater 61 and sensing thermocouple 59, as well as conventional electrical insulation, as at 71, on the conductors leading to the heater and thermocouple.

If desired, the upper portion of the probe, above the thermocouple 59 and heater 61, may be filled with a conventional thermal insulating barrier shown at 57. Also, if desired, an additional thermocouple (not shown) may be provided as a reference thermocouple and positioned in thermal isolation from the heater 61 for sensing the ambient temperature of the vapor adjacent the probe, so as to cancel the effect of changes in ambient vapor temperature on the output signal of sensing thermocouple 59.

In the embodiment shown in FIG. 3, heater 61 is energized from a conventional electric power source 73, controlled by switch 74. The electric power fed to the heater is preferably monitored, as by a conventional wattmeter 76. The electrical output of the thermocouple 56 and 59 is fed through conductors 63 and 64 to a suitable readout and/or alarm circuit 72, here exemplified by a voltmeter 79 driven by a conventional amplifier 81. With a given electrical input to the heater 61, as ascertained from the wattmeter 76, the meter 79 may be calibrated, for a given probe 51 and separating unit 24, in any desired units of flow measurement, such as CFM, SCFM, pounds per hour, feet per second, cost per unit time, etc. Instead of, or in addition to, a continuous readout device such as meter 79, it is also contemplated that a two-state output or alarm device (not shown) may be employed to produce a good/bad judgment in response to the output of probe 51. While the particular readout system shown in FIG. 3 is of electrical type, other types, such as electronic, hydraulic, etc. may be employed.

OPERATION

Although the operation of the apparatus described above will be understood from the foregoing description by skilled persons, a summary is set forth below for convenience.

To measure the flow rate of the vapor phase of the fluid in conduit 16, wherein unknown quantities of the liquid phase are present and flowing, the separator 24 separates the two phases (steam and condensate) of the bi-phase fluid entering through its inlet opening 33 and, in the embodiment shown, permits recombination of the phases for discharge from its outlet opening 34. The bi-phase fluid (e.g., condensate and steam) flowing through the inlet 33 into the separator casing 25 encounters the substantially greater cross-sectional area of the casing (as compared to the relatively small cross-sectional area of conduit 16). This cross-section expansion substantially decreases the velocity of the bi-phase fluid within the separator and allows the liquid phase to drop down into the lower portion of the separator casing. The liquid phase then passes through the lower opening 41 of the baffle and out the outlet opening 34. In ongoing operation, a quantity of liquid remains in the bottom portion of the separator casing 25 to seal the opening 41 against flow of the vapor phase therethrough. Accordingly, the vapor phase can only flow upward through the top portion of the separator casing 25, through the vapor port 43 and then down to the outlet opening 34.

Accordingly, the separator is a passive element within the conduit 16 in which it is installed. The flow rate through the separator 23 is thus a function of the bi-phase fluid circuit 10 in which it is installed, rather than of the separator structure itself.

The probe 51 lies in the vapor phase flow and senses the velocity thereof. The FIG. 3 circuitry connected to the probe provides an output or readout (as at gauge 79) indicating the vapor phase flow rate through the conduit 16.

In the FIG. 1 steam circuit, steam is transmitted to the consumer device 14 as a source of heat. As heat is transferred from the consumer device 14, steam therein condenses. The steam trap 20 conventionally discharges this condensate while blocking significant flow of steam therethrough, if the steam trap is operating properly. On the other hand, a worn-out or defective steam trap can result in steam lost from the trap, and hence a waste of heat energy. Measurement of the vapor (steam) flow to the steam trap thus is a measure of the energy loss, or waste, due to the trap.

Applicant's energy loss measuring apparatus is capable of determining the magnitude of the steam loss from trap 20. To do so, the separator 24 is interposed in conduit 16 between the steam consumer 14 and steam trap 20. This has several advantages. First, the separator, being upstream of the trap, always remains at the pressure of steam source 11, which avoids problems resulting from flashing of condensate to steam as the result of a pressure drop. Second, high measurement accuracy is achieved by reason of the fact that any steam passing through the steam consumer going to the trap is an energy loss. More particularly, in theory all heat energy should be used in the heat exchanger and none lost downstream. Such steam loss must pass through the separator 24 of sensing unit 23 and thereby be measured, independent of which phase it is in when discharged from the trap 20. Accordingly, it is immaterial whether the trap defect is such that it discharges this steam directly as a live steam loss, or permits same to condense in the trap and be discharged as condensate.

By permitting the readout device, as at 79 in FIG. 3, to display the steam flow (or loss) in the most applicable units, the skill required of the person that is to determine the steam loss is minimized. Moreover, operation is independent of the particular type of steam trap used.

If desired the readout circuit 72 of FIG. 3 may be permanently connected to the corresponding separator 24 and probe 51. On the other hand, the readout circuit 72 may be a portable unit usable alternately with many different separator-probe units by a suitable detachable connection, schematically indicated at 81 (FIG. 3) to the electrical conductors of the probe 51.

It is also contemplated that the probe 51 may be removably mounted on the top portion 38 of casing 25, for example by threaded engagement. When measurement is not required at a given separator 24, a conventional threaded plug (not shown) can replace the removable probe. The removable probe can then be installed in other separators 24, thus minimizing the number of probes required to service a plurality of separators. Moreover, removal of the probe 51 from the separator casing 25, during intervals when no measurement is needed, would substantially reduce or eliminate damage to or contamination of the sensing end of the probe where the fluids passing through the separator incorporate hostile materials.

While the vapor flow measuring portion of the apparatus has been disclosed herein in connection with measurement of steam loss to a steam trap, it will be understood that same is also usable for other steam flow measurements in steam systems, for example measurements of steam flow into or out of control valves, bypass valves, heat exchangers, steam traps and so forth. Use in refrigeration systems for vapor phase refrigerant flow measurement is also contemplated as a further example of applications involving bi-phase fluids.

MODIFICATION

Figure 4:
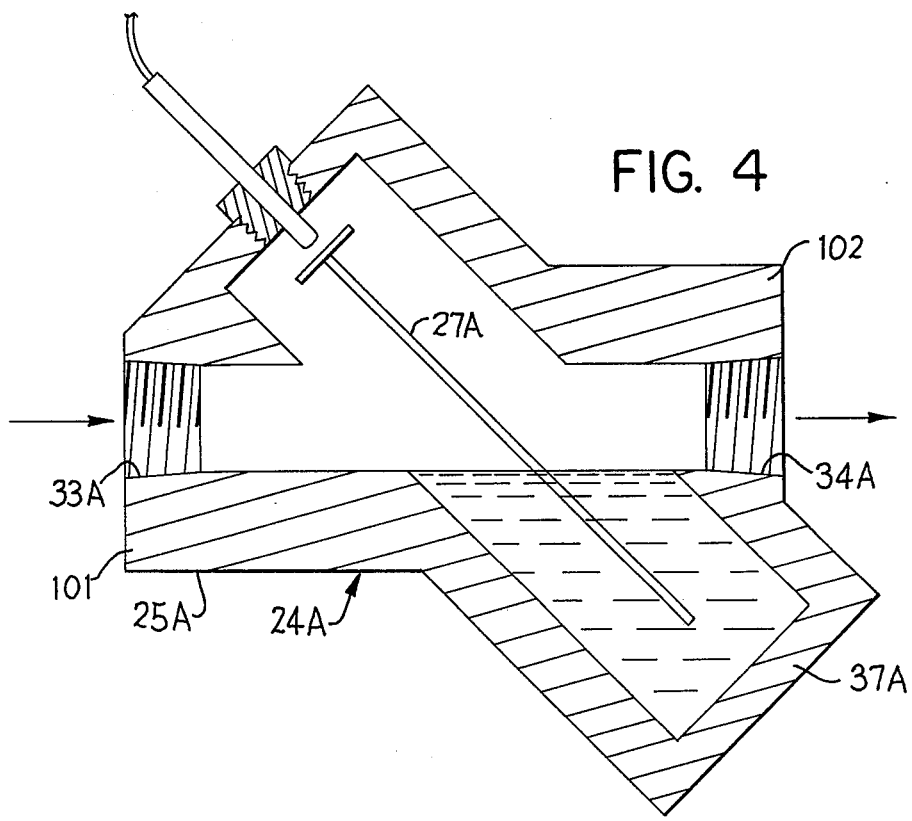

FIGS. 4 and 5 disclose a modified separator 24A in which the casing 25A has inlet and outlet openings 33A and 34A, respectively, aligned on a common axis extending at an angle of about 45° to the length dimension of the casing 25A and to the baffle 27A therein. The inlet and outlet openings 33A and 34A are provided in bosses 101 and 102, respectively, angularly arranged on the casing 25A. The inlet and outlet openings 33A and 34A are spaced from the bottom wall 37A of the casing. In the preferred embodiment shown, the casing bottom wall 37A is offset below the outlet opening 34A by a dimension approximately the width of the casing interior. The baffle 27A extends well below both of the openings 33A and 34A. Thus, the separator 24A can be coaxially inserted in a horizontal conduit line, as in the embodiment of FIG. 2, but in addition can also be coaxially inserted in a sloped, or even vertical conduit line because the inlet and outlet openings 33A and 34A can be sloped or vertically aligned as in FIG. 5. The preferred direction of fluid flow through the separator 24A is indicated by the arrows at the inlet and outlet openings.

The separator 24A is further modified in that the vapor port 42A is formed between a ledge 43A fixed atop the baffle 27A and the top wall 38A of the casing. The probe 51A is releasably secured by a threaded fitting 104 through the top wall 38A of the casing and extends in substantially centered relation into the port 42A so as to monitor vapor flow through the port.

FIG. 6 discloses a further modified separator 131 comprising a casing 132 having a central chamber 133 and coaxially aligned inlet and outlet openings 136 and 137 on opposite sides of the chamber 133. The inlet and outlet openings 136 and 137 are here provided in projecting bosses 138 and 139 on the casing 132 for connection by any convenient means not shown in a fluid carrying conduit as above discussed with respect to separators 24 and 24A.

However, the separator 131 operates on a different operating principle than the aforementioned embodiments. Particularly, a nozzle 141 fixed within the inlet side of the chamber 133 includes a central passage 142 coaxially aligned with the inlet and outlet openings 136 and 137. The central passage 142 is funnel-shaped, having an inlet portion 144 in direct sealed communication with the inlet opening 136 and necked down therefrom to a reduced cross section cylindrical outlet portion 146. The outlet end of the nozzle passage outlet portion 146 is aimed toward but spaced from the outlet opening 137 so as to be in free communication with the remainder of the chamber 133. A probe 51B, which may be similar to probes 51 and 51A, is mounted on the casing 132 and extends into the chamber 133 in transversely offset relation to the nozzle 141. The probe 51B is thus spaced from the coaxial path through the inlet opening 136, nozzle 141 and outlet opening 137.

In operation, a fluid entering the inlet opening 136 is reduced in flow cross section and tends to increase in flow velocity as it travels through the nozzle 141, to exit the nozzle as a jet passing directly out of the chamber 133 through the outlet opening 137. In the case of a bi-phase fluid, such as a mixture of water and steam, the liquid phase tends to travel through the nozzle 141 and out the outlet opening 137 as a limited cross section jet, as generally indicated by the arrow 150. A portion of the vapor phase leaves the outlet opening with the liquid phase. As in the foregoing embodiments, the temperature of the probe 51B decreases or increases with an increase or decrease, respectively, in the amount of vapor phase in the bi-phase fluid passing through the separator 131. It is theorized that a portion of the vapor phase circulates through the chamber 133 past the probe 51B, as indicated by the arrows 151, with the vapor flow past the probe increasing with the amount of vapor in the bi-phase fluid.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a steam system, including:
    a source of steam;
    a steam consuming device supplied by said source and connected along a steam line downstream of said source;
    a steam trap connected in said steam line downstream of said consuming device;
    the improvement comprising:
    energy loss measuring means for measuring steam loss in said steam trap, and including means interposed in said steam line between said consuming device and said steam trap for measuring the flow rate of steam therethrough to said steam trap, independent of condensate flow therethrough.

2. The apparatus of claim 1 in which said means interposed in said steam line includes a hollow separator casing, means in said casing for separating the steam from condensate in a fluid flow in said steam line and directing said steam along a vapor flow path free of said condensate and means in said casing responsive to flow of said steam through said vapor flow path for producing a signal related to said steam flow rate.

3. The apparatus of claim 2 in which said hollow separator casing is divided into inlet and outlet chambers by a baffle, an inlet opening in the casing wall for admitting said fluid flow into said inlet chamber, outlet opening means for discharging said fluid flow from said outlet chamber, said inlet and outlet openings being substantially aligned along an axis passing through the central portion of said baffle, said baffle being open at a location spaced below said inlet and outlet openings for liquid flow therepast from said inlet chamber to said outlet chamber, means defining a vapor port through said baffle above said inlet opening and outlet opening for vapor flow from said inlet chamber to said outlet chamber, said vapor port being spaced above the normal liquid level in said casing, said steam flow responsive means including probe means located at said vapor port to sense the rate of vapor flow therethrough.

4. The apparatus of claim 2 in which said hollow separator casing is divided into inlet and outlet chambers by a baffle, an inlet opening in said casing wall for admitting steam and condensate into said inlet chamber, an outlet opening for discharging steam and condensate from said outlet chamber, said inlet and outlet openings being disposed intermediate in the height of said casing, said baffle extending above and below said inlet and outlet openings, said baffle being open at a location spaced below said inlet and outlet openings for permitting condensate flow therepast from said inlet chamber to said outlet chamber, means defining a steam port through said baffle above said inlet opening and outlet opening for steam flow from said inlet chamber to said outlet chamber, said steam port being spaced above the normal condensate height in said casing, said steam flow responsive means including probe means located at said steam port to sense the rate of steam flow therethrough.

5. The apparatus of claim 4, in which said steam port comprises a substantially horizontal guide member having at least bottom wall and side wall portions extending through said baffle near the upper end thereof and in open communication between said inlet and outlet chambers, said probe means being located in the flow through said guide member.

6. The apparatus of claim 4, including a horizontal splash prevention ledge disposed in said inlet chamber between said baffle and the casing peripheral wall in spaced relation above the normal condensate level in said casing for partially blocking the vapor flow path from said inlet opening to said steam port to prevent splashing of condensate into the latter.

7. The apparatus of claim 4, in which said inlet and outlet openings are substantially aligned along an axis intersecting said baffle, the bottom end of said chambers and of said baffle being spaced below said inlet and outlet openings both with said inlet and outlet openings aligned vertically and with inlet and outlet openings aligned horizontally, whereby said separator casing can be inserted coaxially into both vertical and horizontal conduit lines.

8. The apparatus of claim 7, in which said axis and the portion of said baffle through which said axis passes are oriented at an acute angle to one another.

9. The apparatus of claim 2 in which said hollow separator casing has coaxially aligned inlet and outlet openings on opposite sides thereof, said casing containing a nozzle coaxially aligned with said inlet and outlet openings and extending from said inlet opening only partway to said outlet opening, said nozzle having a passage therethrough coaxial with said inlet and outlet openings, said passage including means for necking down the flow from said inlet opening to form a reduced cross section jet of increased velocity aimed out of said chamber through said outlet opening, whereby the liquid phase of bi-phase fluid passes in such jet directly from said nozzle through said outlet opening, said flow responsive means comprising a probe inserted into said casing and offset from the coaxial path through said inlet, nozzle and outlet for monitoring a circulating flow of vapor released by said nozzle into the interior of said casing.

* * * * *